(12) United States Patent
Engelhardt

(10) Patent No.: US 6,466,381 B2
(45) Date of Patent: Oct. 15, 2002

(54) APPARATUS FOR POSITIONING AN OPTICAL COMPONENT IN A BEAM PATH

(75) Inventor: Johann Engelhardt, Bad Schoenborn (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 0 days.

(21) Appl. No.: 09/766,470

(22) Filed: Jan. 19, 2001

(65) Prior Publication Data

US 2001/0009480 A1 Jul. 26, 2001

(30) Foreign Application Priority Data

Jan. 26, 2000 (DE) .......................... 100 03 391

(51) Int. Cl.[7] .............................. G02B 27/02; G02B 7/02
(52) U.S. Cl. ........................................ 359/804; 359/811
(58) Field of Search .................................. 359/368, 425, 359/804, 811, 813, 819, 821, 822

(56) References Cited

U.S. PATENT DOCUMENTS

| | | | | |
|---|---|---|---|---|
| 5,497,272 A | * | 3/1996 | Wun | 359/821 |
| 5,576,897 A | * | 11/1996 | Kuo | 359/822 |
| 5,638,222 A | * | 6/1997 | Shigehara | 359/814 |
| 6,219,180 B1 | * | 4/2001 | Hasegawa et al. | 359/387 |
| 6,222,671 B1 | * | 4/2001 | Ogihara | 359/390 |
| 6,359,731 B1 | * | 3/2002 | Koyama | 359/381 |
| 6,373,626 B1 | * | 4/2002 | Tanaka et al. | 359/390 |

* cited by examiner

Primary Examiner—Georgia Epps
Assistant Examiner—Saeed Seyrafi
(74) Attorney, Agent, or Firm—Simpson & Simpson, PLLC

(57) ABSTRACT

An apparatus for positioning an optical component (1) in a beam path (2), preferably in the beam path of a microscope, in particular of a confocal scanning microscope, multiple optical components (1) being arranged in aligned fashion in a mount (3), is characterized in that the mount (3), as a magazine carriage (3), is guided in a guide block (5) that is positioned in the beam path (2) and has an opening (4) for the beam path (2).

20 Claims, 3 Drawing Sheets

_US 6,466,381 B2_

APPARATUS FOR POSITIONING AN OPTICAL COMPONENT IN A BEAM PATH

CROSS-REFERENCE TO RELATED APPLICATIONS

This invention claims priority of a German patent application DE 100 03 391.1 filed Jan. 26, 2000 which is incorporated by reference herein.

BACKGROUND OF THE INVENTION

The invention concerns an apparatus for positioning an optical component in a beam path, preferably in the beam path of a microscope, in particular of a confocal scanning microscope, multiple optical components being arranged in aligned fashion in a mount.

Apparatuses of the generic type have been known in practical use for some time. In this context, there are many applications in which it is necessary to interchange multiple optical elements, for example mirrors or beam splitters, without great effort. In practical use, however, the effort associated therewith is considerable, since each optical element that is introduced must be realigned.

Generic apparatuses are known in the form of turreted mounts or magazine mounts in which multiple optical elements, for example mirrors or beam splitters, are pre-aligned. With these known apparatuses, however, it is necessary to align each optical element (of the turret or magazine) individually (i.e. considered of itself) in the respective working position, especially since even the slightest angular errors or angular inaccuracies result in imaging errors. In addition, it is not possible to exchange the entire revolving turret or magazine if the situation affecting the beam path involves stringent reproducibility requirements. For these reasons, the generic apparatuses, for example turrets or magazine mounts, are usually permanently built in, so that only individual optical elements are replaceable—with the necessity for laborious alignment each time.

In an application in scanning microscopy, in the case of the beam splitter used therein it is very particularly important to achieve absolute angular accuracies of <0.1 mrad, and the beam splitters located in the beam path should be exchangeable during operation. It has not hitherto been possible to exchange individual optical elements without alignment. Exchanging the entire turret is conceivable, but each individual beam splitter must be aligned again afterward. This is not acceptable because of the enormous expenditure of time, and moreover requires the use of trained personnel which increases operating costs.

BRIEF SUMMARY OF THE INVENTION

It is therefore the object of the present invention to configure and develop an apparatus for positioning an optical component in a beam path in such a way that optical elements can be exchanged easily, quickly, and precisely. The need to align the optical components each time is to be eliminated to a very large extent.

The above object is achieved by an apparatus for positioning an optical component in a beam path comprising:
 a mount for holding a plurality of optical components in aligned fashion, wherein the mount is configured as a magazine carriage;
 a guide block having an opening for the beam path and wherein the guide block defines a guidance surface; and
 an optically active surface of the optical component lies in a plane which is parallel to the guidance surface of the mount.

It is an other object of the invention to provide a confocal scanning microscope which allows an easy, quick, and precise positioning of at least one optical component in the beam path.

The object is achieved by a confocal scanning microscope defining a beam path, wherein the confocal scanning microscope comprises:
 an apparatus for positioning an optical component in the beam path;
 a mount for holding a plurality of optical components in aligned fashion, wherein the mount is configured as a magazine carriage;
 a guide block having an opening for the beam path and wherein the guide block defines a guidance surface; and
 an optically active surface of the optical component lies in a plane which is parallel to the guidance surface of the mount.

What has been recognized according to the present invention is that the technology hitherto implemented can be retained inasmuch as multiple optical components, of the same or different types, are arranged in aligned fashion in a mount. This mount serves, according to the present invention, as a magazine, and is guided in a guide block positioned permanently in the beam path. This guide block has an opening for the beam path, so that the beam path extends through the guide block. The magazine can be displaced in the guide block, as a result of which the optical components arranged therein can be brought—individually, in accurately positioned fashion, and aligned in the mount or magazine—into the beam path. The magazine is calibrated or aligned with respect to the guide block and thus with respect to the beam path.

In the interest of alignment-free exchange of the optical components located in the mount or magazine, it is very particularly advantageous if the optically active surface of the component lies in a plane parallel to the guidance plane of the magazine. Once the optical components have been aligned and a mount or magazine has been aligned in the guide block, loss of alignment during operation or upon displacement of the magazine is to a very large extent ruled out because of the concrete arrangement. It is also conceivable for the optically active surface of the component, for example a mirror surface or the effective surface of a prism, to lie at least largely in the guidance plane of the magazine. Angular inaccuracies are thereby effectively eliminated; this is ultimately attributable to the arrangement of the optical components in the mount or magazine, and the aligned or calibrated arrangement of the magazine in the guide block.

In additionally advantageous fashion, the magazine is displaceable in the guide block without tilting errors. Any desired actions can be taken for that purpose; easy exchange of the magazine must be guaranteed. In this context it is necessary in any case to be able to remove the magazine from the guide block from above.

For reliable guidance of the magazine in the guide block, it is advantageous if the guide carriage can run almost freely linearly, but is retained on it in its running direction. For that purpose, a preferably constant applied pressure, which changes not at all or only insignificantly even during displacement of the magazine, acts on the magazine. In this context it is very particularly important that the magazine be displaceable at least largely with a constant applied pressure acting on the guidance surface, specifically in order to be able to guarantee homogeneous displacement.

The displacement of the magazine by way of which the respective optical components can be brought into their positions associated with the beam path can, in the simplest case, be accomplished manually. It is also possible to drive the magazine with a precisely operating motor, or to displace it with a motor. Electric motors suitable for precision positioning can be used in any desired configuration.

As already mentioned above, the magazine serves on the one hand to receive the optical components and on the other hand for displacement in the guide block. For that purpose, the magazine could be configured similarly to a frame. It is also conceivable, however, to configure the magazine as a plate having passthroughs; that plate can have two parallel surfaces (upper side and lower side). The surface facing toward the guide block is then used for guidance. In other words, the plate lies with its lower surface on a corresponding surface of the guide block.

In the context of a somewhat more complex embodiment, the plate of the magazine could have, on the side facing toward the guide block, a guide region for linear guidance which engages into a corresponding recess of the guide block. The result of this design is that guidance without tilting errors is provided simultaneously by multiple surfaces, namely on the one hand the underside that is directly in contact on the guide block, and on the other hand lateral surfaces that engage into the recess of the guide block. This guarantees linear positive guidance.

The beam passthroughs configured in the magazine are preferably round, and extend with a sufficient diameter (in accordance with the dimensions of the optical component) through the magazine as a whole. At least on the side facing away from the optical component, the beam passthroughs formed in this fashion could expand conically, thus promoting unimpeded incidence of the beam. A corresponding conical configuration on the other side of the magazine is conceivable, particular precautions in terms of positioning the optical component being necessary there.

In the context of linear displaceability of the magazine, it is additionally advantageous if the beam passthroughs are arranged linearly along the plate (in its longitudinal axis), so that the optical components provided there are positionable, without additional alignment, by simple linear displacement of the magazine in the beam path. It could be additionally advantageous for the beam passthroughs to be arranged equidistant from one another, thus facilitating automatic displacement and positioning of the magazine.

The positioning of the optical components has already been discussed above. In this connection, it is advantageous if the latter are arranged with their active surfaces in the guidance plane or parallel to the guidance plane of the magazine, preferably concentrically with the beam passthroughs. This arrangement, too, facilitates reliable positioning of the optical components, once again without particular alignment effort.

Concretely, the optical components could rest against the guidance surface of the magazine or be inserted into the beam passthroughs of the magazine. Particular holders or receptacles are conceivable, specifically in consideration of the geometry of the particular optical components.

In order to retain the optical components, especially when they are simply in contact against the guidance surface of the magazine, they could be retained in their positions by way of clips associated with the magazine. If the contact surfaces are appropriately calibrated, alignment is superfluous, although it may certainly be necessary to align the optical components when first arranged in the magazine. The necessary effort depends on the particular requirements.

The guide block is a component which is permanently arranged in the beam path, and which can be configured as a cubical metal block having corresponding recesses and guidance properties. Concretely, the guide block could have a guide bed, preferably of right-angled configuration, for the guide carriage, thus making possible positionally accurate guidance of the magazine.

The guide block could also have a recess extending in the longitudinal direction, preferably over the entire length and, in particular, centeredly, for unimpeded linear movement of the optical components retained on the magazine. In the context of such an embodiment, the optical components could be arranged beneath the magazine (in the region of the recess extending in the longitudinal direction), so that unintentional loss of alignment is effectively prevented by way of the open space provided there.

It has already been mentioned earlier that the magazine can be guided linearly in the guide block (and now also in its guide bed). The magazine is held in the guide plane or guide track by a suitable force impingement; the force impingement can be accomplished by way of a spring. That spring acts preferably orthogonally to the displacement direction of the magazine, a ball, which permits a linear motion of the magazine and rolls on the surface of the magazine, being provided between the spring and the magazine. A corresponding groove in the magazine could allow the rolling motion. Other methods for pressure impingement and thus for secure positioning of the magazine in or on the guide block are also conceivable.

Lastly, be it noted once again that the optical components can be any desired optical components that are used in an optical beam path. These can include, for example, a mirror or a beam splitter, which are always used in the context of confocal scanning microscopy.

BRIEF DESCRIPTION OF THE SEVERAL VIEWS OF THE DRAWING

There are various ways of advantageously embodying and developing the teaching of the present invention. Reference is made, for that purpose, on the one hand to the Claims which follow claim 1, and on the other hand to the explanation below of two preferred exemplary embodiments of the invention with reference to the drawings. In conjunction with the explanation of the preferred exemplary embodiments of the invention with reference to the drawings, an explanation is also given of generally preferred embodiments and developments of the teaching. In the drawings:

DETAILED DESCRIPTION OF THE INVENTION

Figure 1:
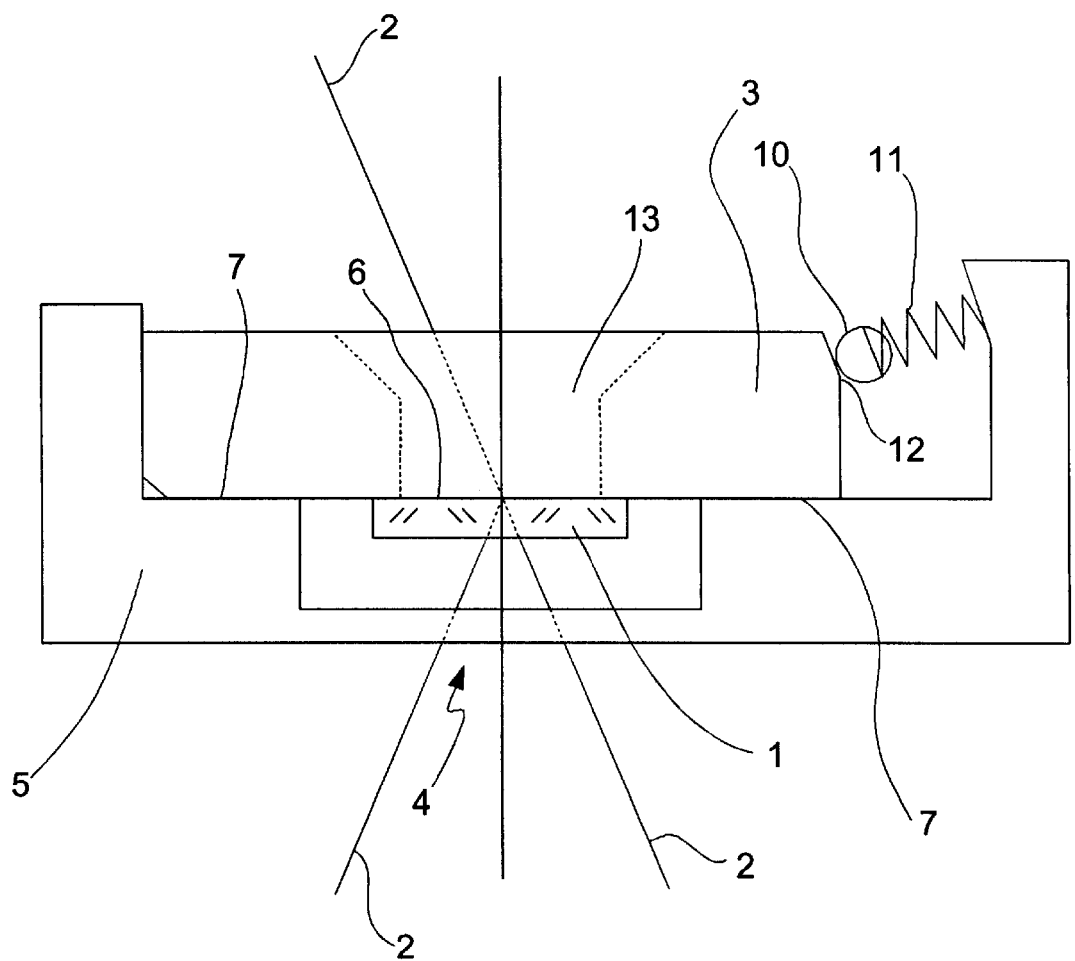
FIG. 1 shows, in a schematic side view and in section, a first exemplary embodiment of an apparatus according to the present invention.

FIG. 1 shows a first exemplary embodiment of an apparatus according to the present invention for positioning an optical component 1, which here is concretely a beam splitter. Optical component 1 is positioned in symbolically depicted beam path 2, multiple optical components 1 being simultaneously arranged in aligned fashion in a mount 3. This arrangement of multiple optical components 1 in mount 3 is evident in particular from FIG. 2.

According to the present invention, mount 3 is configured as a magazine, the magazine (hereinafter labeled with the reference character 3) being guided in a guide block 5 that is positioned in beam path 2 and has an opening 4 for beam path 2.

In the exemplary embodiment shown in FIG. 1, optically active surface 6 of optical component 1 is arranged exactly in guidance plane 7 of magazine 3. The second exemplary embodiment of the apparatus according to the present invention, shown in FIG. 3, differs from the first exemplary embodiment shown in FIGS. 1 and 2 only in that in FIG. 3, optically active surface 6 of optical component 1 is arranged not in guidance plane 7 of magazine 3 but rather in a plane 8 that lies parallel to guidance plane 7 of magazine 3 but spaced away from it.

Figure 2:
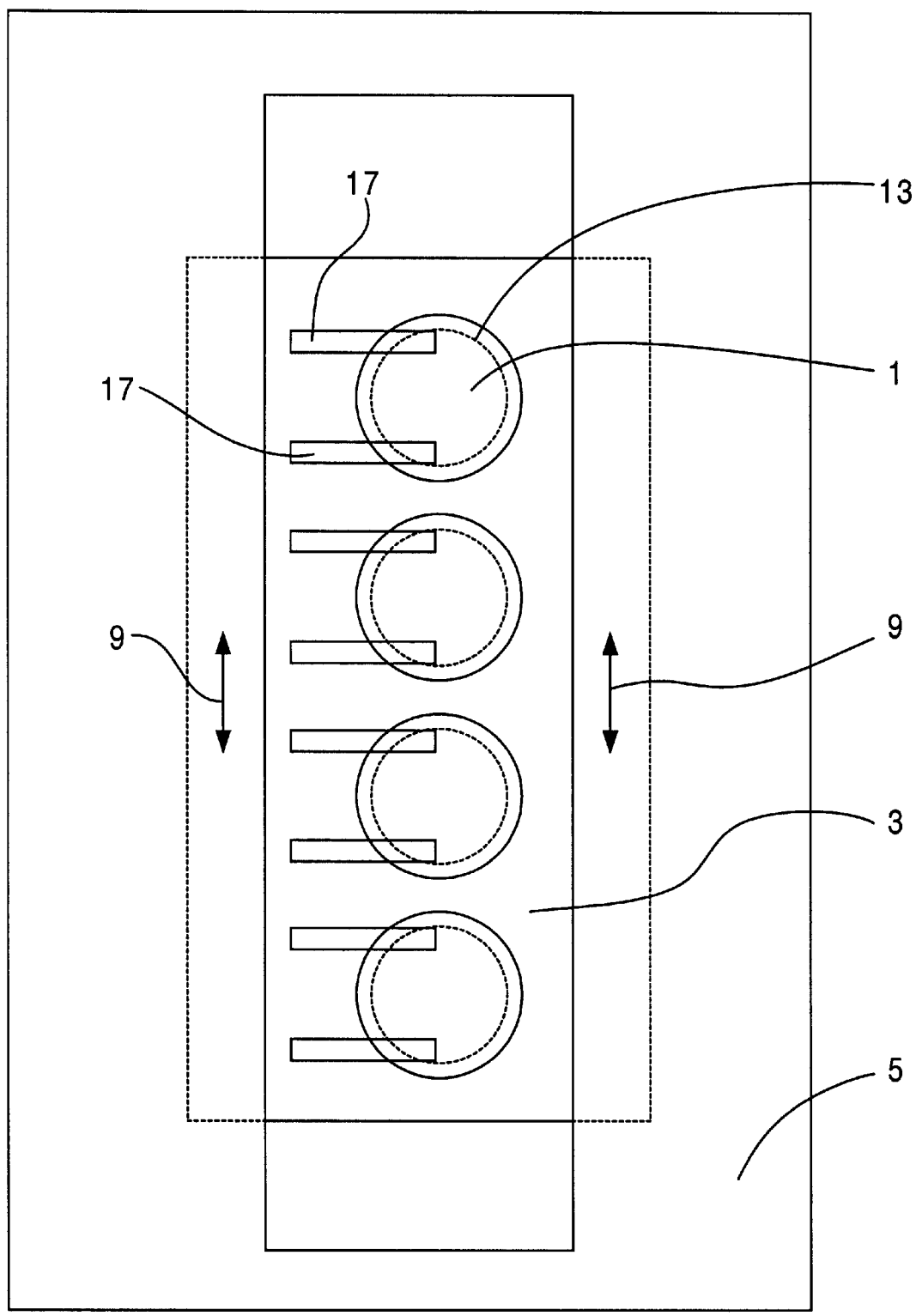
FIG. 2 shows, in a view from below, the subject matter from FIG. 1.
Figure 3:
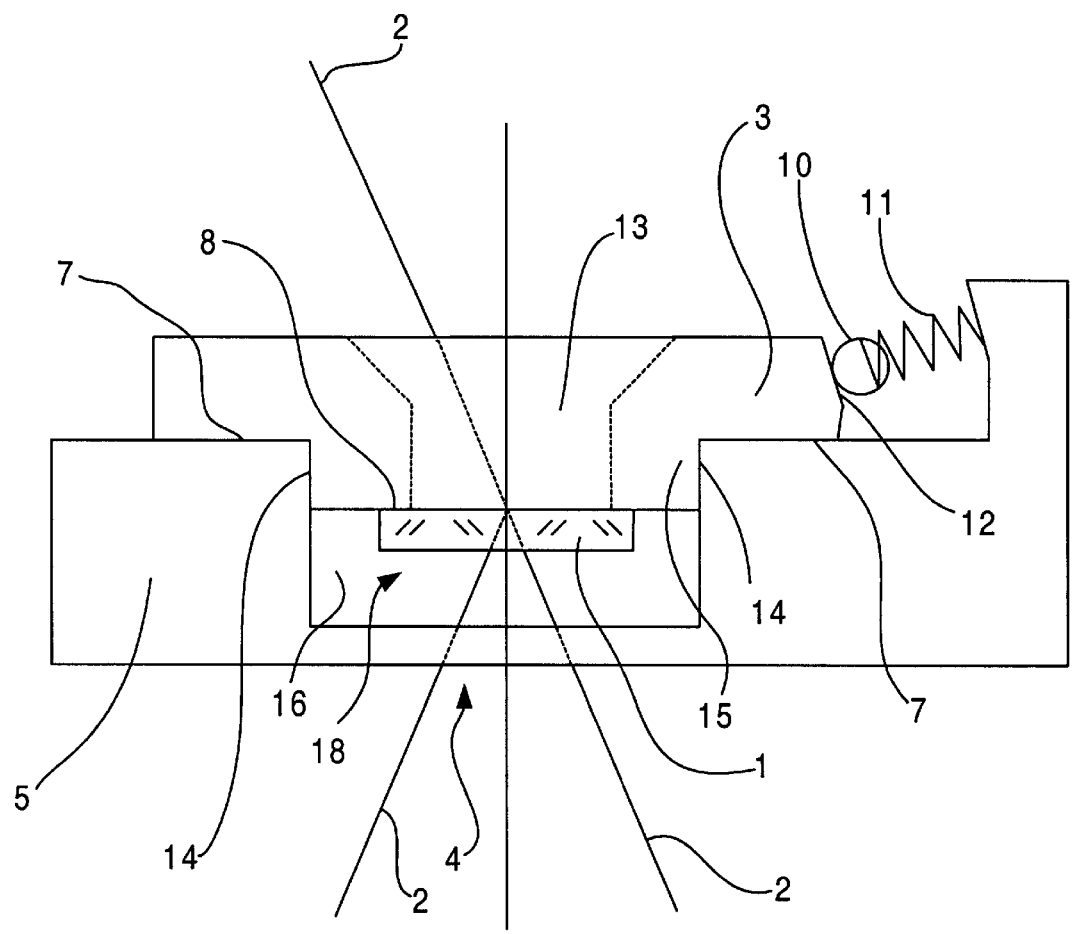
FIG. 3 shows, in a schematic side view and in section, a second exemplary embodiment of an apparatus according to the present invention.

FIGS. 1 and 3 show in outline fashion that magazine 3 is displaceable in guide block 5 in a manner free of tilting errors. The displacement direction of magazine 3 is marked in FIG. 2 with arrows 9.

Magazine 3 is displaceable with a uniform applied pressure acting on guidance surface or guidance plane 7, said applied pressure being effected by a spring 11 comprising a rolling ball element 10. Ball element 10 rolls on a suitable, obliquely placed rolling surface 12 on magazine 3.

In the exemplary embodiments shown in FIGS. 1 through 3, magazine 3 is displaceable manually. A motor drive is conceivable.

FIGS. 1 and 3 all show that magazine 3 is configured as a plate having beam passthroughs 13. In the exemplary embodiment shown in FIG. 1, the plate comprises two parallel surfaces, the surface facing toward guide block 5 (guidance surface 14) providing the actual guidance of magazine 3.

In the exemplary embodiment shown in FIG. 3, magazine 3 or the plate forming magazine 3 is equipped on the side facing toward guide block 5 with a guidance region 15 which in turn engages into a corresponding recess 16 of guide block 5. Correct linear guidance is thereby ensured, recess 16 being dimensioned such that any collision with optical components 1 arranged on magazine 3 is ruled out.

It is additionally evident from FIGS. 1 through 3 that beam passthroughs 13 in magazine 3 expand conically on the side facing away from optical component, i.e. toward the top in the depictions. This facilitates unimpeded beam entry.

FIG. 2 shows particularly clearly that beam passthroughs 13 are arranged linearly along magazine 3 (or the plate that forms magazine 3) along its longitudinal axis, specifically equidistantly. Other arrangements are conceivable.

Optical components 1 are arranged with their active surface 6 in guidance plane 7 concentrically with beam passthroughs 13. Optical components 1 rest against guidance surface 14 of magazine 3, specifically against that surface from below. Insertion of optical components 1 into beam passthroughs 13 is possible.

FIG. 2 furthermore indicates that optical components 1 are retained in their positions by way of clips 17 associated with magazine 3. Two clips 17 are provided for each component 1.

Furthermore, be it noted here once again that guide block 5 can have a guide bed 18 of right-angled configuration, specifically in accordance with the exemplary embodiment of FIG. 3. Magazine 3 is guided thereby.

Concretely, guide block 5 comprises a recess 16, extending centeredly in the longitudinal direction over the entire length of guide block 5, which provides unimpeded linear movement of magazine 3 taking into account optical components 1 arranged therein. Magazine 3 is linearly guided in guide block 5 (in the latter's guide bed 18), and is held there in guidance plane 7 by force impingement. The force impingement by way of spring 11 and ball element 10 has already been referred to above.

Be it noted furthermore that in the instance selected here, optical components 1 are beam splitters. Other optical components 1 for a beam path are conceivable. In summary, the following may be stated in light of what has gone before:

Optical components 1 can be mounted with their optically active surfaces 6 directly on magazine 3, and magazine 3 can simultaneously encompass multiple optical components 1. It is immaterial in this context whether all the "spaces" on magazine 3 having beam passthroughs 13 are occupied by optical components 1. One or another beam passthrough can by all means also be unoccupied.

The surface on which optical components 1 rest can simultaneously be guidance plane 7 or guidance surface 14 for movement of the carriage. Magazine 3 is moved linearly in guide block 5; other types of motion can also be implemented.

With regard to alignment, only the reference guidance plane relative to optical beam path 2 is significant and needs to be aligned. Optical components 1 do not need to be aligned per se, but rather merely need to be mounted on magazine 3; one-time calibration of the surfaces and parts responsible for attachment is conceivable.

No interfering adhesive or the like is present between optical components 1 and magazine 3. Optical components 1 instead are set directly onto magazine 3, thus to that extent eliminating any tilting error. Magazine 3 also sits directly on guide block 5, so that there as well it is almost impossible for tilting errors to occur. Magazine 3 moves in guide block 5 in lubricant-free fashion.

Any tilting of magazine 3 in guide block 5 is effectively prevented by suitable force impingement on magazine 3. The applied pressure of magazine 3 on guidance surface 14 is constant, so that any tilting error is eliminated in that respect as well.

A very particularly important advantage of the present invention is the fact that optical components 1 are interchangeable without alignment effort, and a complete exchange of magazine 3 for an identical magazine 3, possibly populated with different optical components 1, is possible. Magazine 3 can be exchanged, without realignment, for a magazine 3 of the same type, the provision therein of different optical components 1 being of subordinate importance.

Lastly, be it noted that the exemplary embodiments set forth above contribute to comprehension of the teaching claimed, but do not limit it to the exemplary embodiments.

What is claimed is:

1. An apparatus for positioning an optical component in a beam path comprising:
    a mount for holding a plurality of optical components in aligned fashion, wherein the mount is configured as a magazine carriage;
    a guide block having an opening for the beam path and wherein the guide block defines at least one guidance surface in slidable contact with the mount; and
    an optically active surface of the optical component lies in a plane which is parallel to the guidance surface of the mount.

2. The apparatus as defined in claim 1, characterized in that the mount is displaceable in the guide block without tilting errors.

3. The apparatus as defined in claim 1, characterized in that the mount has an additional guidance surface which is perpendicular to guidance surface and the mount is displaceable at least largely with the same applied pressure acting on the guidance surface.

4. The apparatus as defined in claim 1, characterized in that the mount is configured as a plate and forming passageways for the beam path.

5. The apparatus as defined in claim 4, characterized in that the passageways for the beam path expand preferably conically, at least on the side facing away from the optical component.

6. The apparatus as defined in claim 4, characterized in that the passageways for the beam path are arranged linearly along the mount.

7. The apparatus as defined in claim 4, characterized in that the optical components are arranged with their active surfaces parallel to the guidance surface and are positioned concentrically within passageways for the beam path.

8. The apparatus as defined in claim 4, characterized in that the optical components are inserted into the passageways for the beam path.

9. The apparatus as defined in claim 8, characterized in that the optical components are retained in their positions by way of clips associated with the mount.

10. The apparatus as defined in claim 1, characterized in that the guide block has a guide bed for the mount and the guide block has a recess formed in the center and extending in the longitudinal direction, for unimpeded linear movement of the optical components retained on the mount.

11. A confocal scanning microscope defining a beam path comprises:

a mount for holding a plurality of optical components in aligned fashion, wherein the mount is configured as a magazine carriage;

a guide block having an opening for the beam path and wherein the guide block defines at least one guidance surface in slidable contact with the mount; and an optically active surface of the optical component lies in a plane which is parallel to the guidance surface of the mount.

12. The confocal scanning microscope as defined in claim 11, characterized in that the mount is displaceable in the guide block without tilting errors.

13. The confocal scanning microscope as defined in claim 11, characterized in that the mount has an additional guidance surface which is perpendicular to guidance surface and the mount is displaceable at least largely with the same applied pressure acting on the guidance surface.

14. The confocal scanning microscope as defined in claim 11, characterized in that the mount is configured as a plate and forming passageways for the beam path.

15. The confocal scanning microscope as defined in claim 14, characterized in that the passageways for the beam path expand preferably conically, at least on the side facing away from the optical component.

16. The confocal scanning microscope as defined in claim 14, characterized in that the passageways for the beam path are arranged linearly along the mount.

17. The confocal scanning microscope as defined in claim 14, characterized in that the optical components are arranged with their active surfaces parallel to the guidance surface and are positioned concentrically within passageways for the beam path.

18. The confocal scanning microscope as defined in claim 14, characterized in that the optical components are inserted into the passageways for the beam path.

19. The confocal scanning microscope as defined in claim 18, characterized in that the optical components are retained in their positions by way of clips associated with the mount.

20. The confocal scanning microscope as defined in claim 19, characterized in that the guide block has a guide bed for the mount and the guide block has a recess formed in the center and extending in the longitudinal direction, for unimpeded linear movement of the optical components retained on the mount.

* * * * *